United States Patent
Farkas et al.

(10) Patent No.: US 11,163,291 B2
(45) Date of Patent: Nov. 2, 2021

(54) SYSTEM AND METHOD OF DETERMINING COOLANT LEAKS WITHIN INFORMATION HANDLING SYSTEMS

(71) Applicant: Dell Products L.P., Round Rock, TX (US)

(72) Inventors: Sandor Farkas, Round Rock, TX (US); Bhyrav M. Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 519 days.

(21) Appl. No.: 16/270,906

(22) Filed: Feb. 8, 2019

(65) Prior Publication Data
US 2020/0257263 A1 Aug. 13, 2020

(51) Int. Cl.
*G05B 19/406* (2006.01)
*G06F 13/42* (2006.01)

(52) U.S. Cl.
CPC ....... *G05B 19/406* (2013.01); *G06F 13/4221* (2013.01); *G05B 2219/50324* (2013.01); *G06F 2213/0026* (2013.01)

(58) Field of Classification Search
CPC ............ G05B 19/406; G06F 13/4221
USPC ........................................... 700/300
See application file for complete search history.

(56) References Cited

U.S. PATENT DOCUMENTS

2007/0051166 A1* 3/2007 Baker .................. G01M 3/188
 73/40.5 R
2011/0303394 A1* 12/2011 Branton ............. H05K 7/20754
 165/104.33

OTHER PUBLICATIONS

Tröndle, J., et al. "Non-contact optical sensor to detect free flying droplets in the nanolitre range." Sensors and Actuators A: Physical 158.2 (2010): 254-262. (Year: 2010).*
CP Series, Cold Plate Four-pass Heatsink, OHMITE, Apr. 2018; 2 pages.

* cited by examiner

*Primary Examiner* — Mohammad Ali
*Assistant Examiner* — Joshua T Sanders
(74) *Attorney, Agent, or Firm* — Baker Botts L.L.P.

(57) ABSTRACT

In one or more embodiments, one or more systems, methods, and/or processes may determine a first height of a first eye diagram of a differential pair of circuit board traces of a circuit board of an information handling system; may determine a first width of the first eye diagram; may transfer a liquid above an area of the circuit board; may provide a differential signal to the differential pair; may determine a second height of a second eye diagram of the differential pair; may determine a second width of the second eye diagram; may determine at least one of that the second height is less than the first height by at least a first threshold and that the second width is less than the first width by at least a second threshold; and may provide information that indicates a presence of the liquid on the circuit board.

20 Claims, 12 Drawing Sheets

SYSTEM AND METHOD OF DETERMINING COOLANT LEAKS WITHIN INFORMATION HANDLING SYSTEMS

BACKGROUND

Field of the Disclosure

This disclosure relates generally to information handling systems and more particularly to determining coolant leaks within information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may determine a first height of a first eye diagram of a differential pair of circuit board traces of a circuit board of an information handling system; may determine a first width of the first eye diagram; may transfer a liquid above an area of the circuit board to remove heat from a component of the information handling system; may provide a differential signal to the differential pair of circuit board traces, the differential pair of circuit board traces proximate to the area of the circuit board; may receive the differential signal from the differential pair of circuit board traces; may determine a second height of a second eye diagram of the differential pair of circuit board traces; may determine a second width of the second eye diagram; may determine at least one of that the second height of the second eye diagram is less than the first height of the first eye diagram by at least a first threshold and that the second width of the second eye diagram is less than the first width of the first eye diagram by at least a second threshold; and may provide information that indicates a presence of the liquid on the circuit board. In one or more embodiments, providing the information that indicates the presence of the liquid on the circuit board may be performed in response to determining the at least one of that the second height of the second eye diagram is less than the first height of the first eye diagram by at least the first threshold and that the second width of the second eye diagram is less than the first width of the first eye diagram by at least the second threshold.

In one or more embodiments, the differential pair of circuit board traces may surround the area of the circuit board. In one or more embodiments, providing the information that indicates the presence of the liquid on the circuit board may include providing the information to at least one of a baseboard management controller of the information handling system and a processor of the information handling system. In one or more embodiments, a signal generator may provide the differential signal to the differential pair of circuit board traces. In one or more embodiments, a signal receiver may receive the differential signal from the differential pair of circuit board traces. In one example, a network interface may include the signal generator and the signal receiver. In one instance, a microcontroller may include the network interface. In another instance, the network interface may include an Ethernet interface. In another example, a platform controller hub may include the signal generator and the signal receiver. In one or more embodiments, a Peripheral Component Interconnect Express (PCIe) lane may be coupled to the differential pair of circuit board traces. In one example, a PCIe root complex may include the PCIe lane. In another example, a PCIe switch may include the PCIe lane. In one or more embodiments, the liquid may include a percentage of water.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
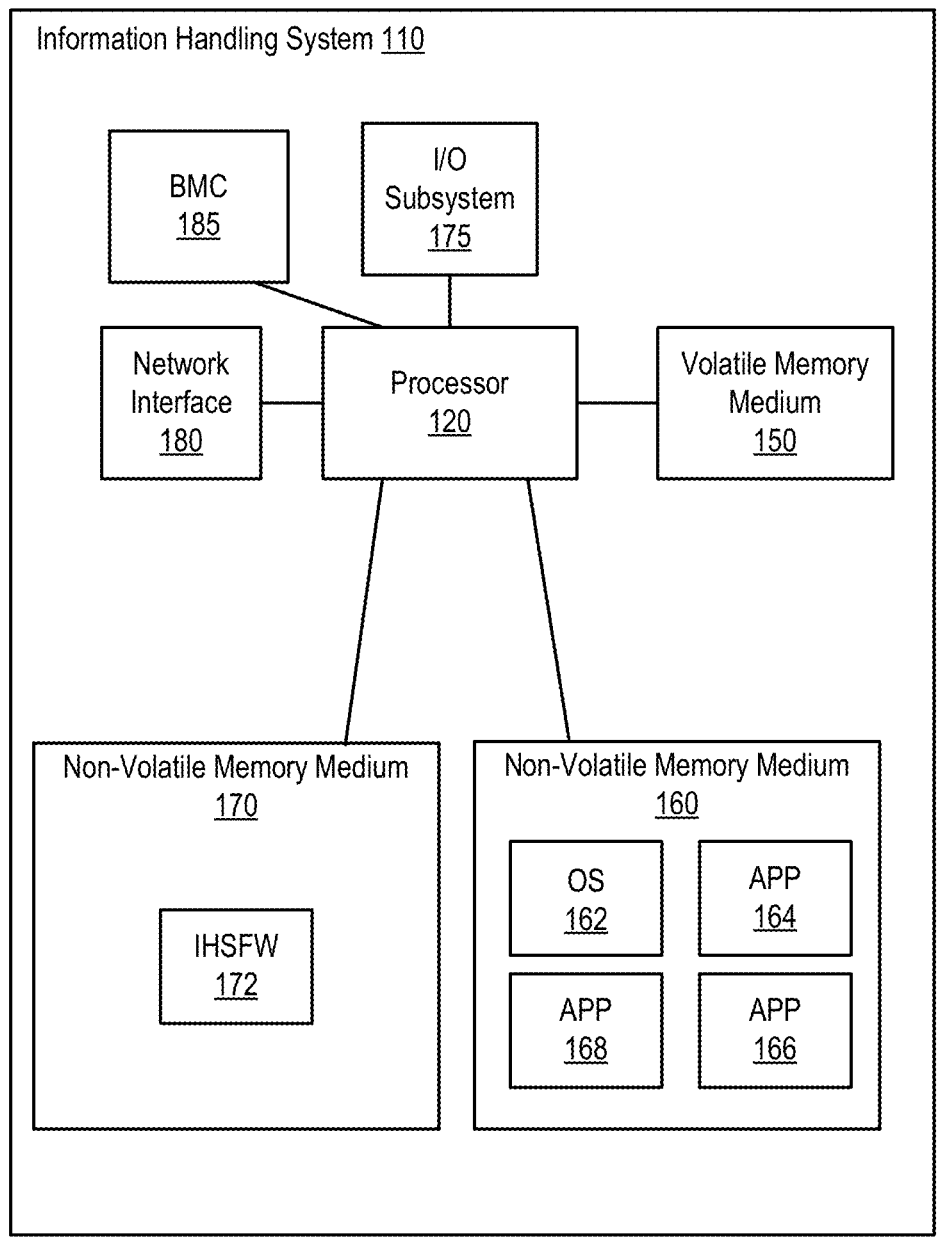
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, one or more components of an information handling system may be cooled. For example, heat may be removed from one or more components of an information handling system. In one or more embodiments, a liquid may be utilized to cool one or more components of an information handling system. For example, a liquid may be utilized to remove heat from one or more components of an information handling system. In one or more embodiments, a liquid utilized to cool and/or remove heat from one or more components of an information handling system may include a mixture of liquids. For example, the mixture of liquids may include a mixture of water and glycol. For instance, the mixture of liquids may include a mixture of seventy-five percent (75%) water and twenty-five percent (25%) propylene glycol.

In one or more embodiments, if a leak of a liquid utilized to cool and/or remove heat from one or more components of an information handling system occurs, one or more portions of the information handling system may be damaged. In one example, the one or more portions of the information handling system that may be damaged may include at least one of the one or more components of the information handling system. In a second example, the one or more portions of the information handling system that may be damaged may include one or more other components of the information handling system. In another example, the one or more portions of the information handling system that may be damaged may include may include one or more circuit boards of the information handling system.

In one or more embodiments, the liquid utilized to cool and/or remove heat from one or more components of the information handling system may cause one or more short circuits. For example, the one or more short circuits may damage the one or more portions of the information handling system. In one or more embodiments, the liquid utilized to cool and/or remove heat from one or more components of the information handling system may cause one or more corrosions. In one example, the one or more corrosions may damage the one or more portions of the information handling system. In another example, the information handling system may not function properly due to the one or more corrosions. In one or more embodiments, the leak of the liquid utilized to cool and/or remove heat from the one or more components of an information handling system may be caused by one or more of vibrations, thermal cycles, aging, oxidation, junction sealant decay, and pests, among others.

In one or more embodiments, traces of a circuit board may be utilized in determining if a leak of a liquid utilized to cool and/or remove heat from one or more components of an information handling system occurs. In one example, a signal may be generated and provided to multiple traces of the circuit board. For instance, the signal may be provided to a differential pair of traces of the circuit board. In another example, the signal may be received from the multiple traces of the circuit board. For instance, the signal may be received from the differential pair of traces of the circuit board.

In one or more embodiments, an impedance associated with the signal may be determined. For example, the impedance may be compared with a nominal impedance. For instance, the nominal impedance may be eight-five Ohms (85Ω). In one or more embodiments, an insertion loss may be determined from the signal. For example, a permittivity ($\varepsilon$) may be compared with a nominal permittivity. For instance, the nominal permittivity may be 3.5 ($\varepsilon_r=3.5$). In one or more embodiments, in a presence of the liquid utilized to cool and/or remove heat from one or more components of the information handling system, a permittivity may be sixty to eighty (60-80) (e.g., $60 \leq \varepsilon_r \leq 80$). In one example, the permittivity may vary based at least on a temperature of the liquid. In another example, the permittivity may vary based at least on a frequency of the signal. For instance, a dielectric loss of water may be higher at higher signal frequencies. In one or more embodiments, a signal loss may be greater as more of the multiple traces of the circuit board are in the presence of the liquid. In one or more embodiments, determining an increase in permittivity may indicate that a leak of the liquid has occurred. In one or more embodiments, determining an increase in insertion loss may indicate that a leak of the liquid has occurred. For example, determining an increase in insertion loss may include determining one or more signal degradations. For instance, an increase in insertion loss may imply and/or indicate that a leak of the liquid.

In one or more embodiments, the multiple traces of the circuit board may be placed at or proximate to an area of the information handling system that may be associated with a higher probability of one or more leaks of the liquid. For example, the multiple traces of the circuit board may be placed at or proximate to an area of one or more processors of the information handling system. In one or more embodiments, the signal may be a low voltage signal. For example, a voltage of the signal may be low enough as to not cause a chemical breakdown of the liquid.

In one or more embodiments, a flex input/output (I/O) lane from a platform controller hub (PCH) may generate the signal. For example, the flex I/O from the PCH may provide the signal to the multiple traces of the circuit board. In one or more embodiments, a generator of the signal may be alternating current (AC) coupled to the multiple traces of the circuit board. For example, capacitors may AC couple the generator of the signal to the multiple traces of the circuit board. For instance, by AC coupling the generator of the signal to the multiple traces of the circuit board, no direct current (DC) signal may be present in the multiple traces of the circuit board.

In one or more embodiments, a network interface may provide the signal to the multiple traces of the circuit board. For example, the network interface may include an Ethernet interface, and the Ethernet interface may provide the signal to the multiple traces of the circuit board. In one instance, a processor may include the network interface. In another instance, a microcontroller may include the network interface. In one or more embodiments, a fabric interface may provide the signal to the multiple traces of the circuit board. For example, the fabric interface may include a full duplex fabric interface, and the full duplex fabric interface may provide the signal to the multiple traces of the circuit board. In one or more embodiments, a receiver RSSI (Received Signal Strength Indication) may be utilized in determining a low signal strength. For example, if the receiver RSSI low enough, an occurrence of a leak of the liquid may be determined. For instance, a receiver RSSI that is low enough may imply and/or indicate a leak of the liquid.

In one or more embodiments, a eye diagram may be determined from the signal from the multiple traces of the circuit board. For example, the eye diagram may be utilized to determine an occurrence of a leak of the liquid. In one or more embodiments, the multiple traces of the circuit board may surround a monitored area of the circuit board. In one example, if the liquid is present in the monitored area of the circuit board, a height of the eye diagram may be less than a height of an eye diagram when the liquid is not present. For instance, the height of the eye diagram may be less than a threshold amount of volts (e.g., an amount of millivolts) if the liquid is present in the monitored area of the circuit board. In another example, if the liquid is present in the monitored area of the circuit board, a width of the eye diagram may be less than a width of an eye diagram when the liquid is not present. For instance, the width of the eye diagram may be less than a threshold amount of second (e.g., an amount of picoseconds) if the liquid is present in the monitored area of the circuit board.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and a baseboard management controller (BMC) 185. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, network interface 180, and BMC 185 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, one or more flowcharts, one or more methods, and/or one or more processes described herein. In one example, processor 120 may execute processor instructions from one or more of memory media 150-170 in implementing at least a portion of one or more systems, one or more flowcharts, one or more methods, and/or one or more processes described herein. In another example, processor 120 may execute processor instructions via network interface 180 in implementing at least a portion of one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, BMC 185 may be or include a remote access controller. For example, the remote access controller may be or include a Dell Remote Access Controller (DRAC). In one or more embodiments, a remote access controller may be integrated into IHS 110. For example, the remote access controller may be or include an integrated Dell Remote Access Controller (iDRAC). In one or more embodiments, a remote access controller may include one or more of a processor, and a memory, a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. For example, the remote access controller may be based at least on an Intelligent Platform Management Interface (IPMI) standard. For instance, the remote access controller may allow and/or permit utilization of IPMI out-of-band interfaces such as IPMI Over LAN (local area network). In one or more embodiments, a remote access controller may include and/or provide one or more internal private networks. For example, the remote access controller may include and/or provide one or more of an Ethernet interface, a front panel USB interface, and a Wi-Fi interface, among others.

In one or more embodiments, BMC 185 may be or include a microcontroller. For example, the microcontroller may be or include an 8051 microcontroller, an ARM Cortex-M (e.g., Cortex-M0, Cortex-M05, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 185 may be configured, coded, and/or encoded with instructions in accordance with one or more of systems, flowcharts, methods, and/or processes described herein. In one or more embodiments, BMC 185 may be configured to implement at least a portion of one or more systems, one or more flowcharts, one or more methods, and/or one or more processes described herein. In one or more embodiments, BMC 185 may be or include one or more of a field programmable gate array (FPGA) and an ASIC, among others, configured, coded, and/or encoded with instructions in accordance with one or more of systems, one or more flowcharts, one or more methods, and/or one or more processes described herein.

In one or more embodiments, processor 120 and one or more components of IHS 110 may be included in a system-on-chip (SoC). For example, the SoC may include processor 120 and a platform controller hub (not specifically illustrated).

Figure 2A:
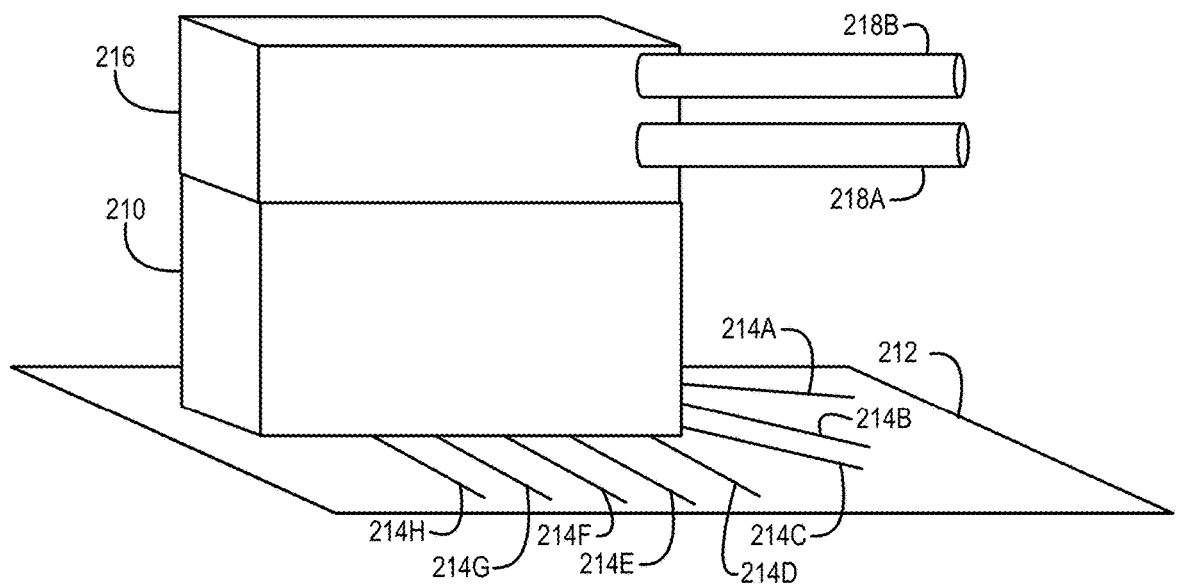
FIG. 2A illustrates an example of a circuit board and a component of an information handling system, according to one or more embodiments.

Turning now to FIG. 2A, an example of a circuit board and a component of an information handling system is illustrated, according to one or more embodiments. As shown, a component 210 may be mounted on a circuit board 212. In one or more embodiments, IHS 110 may include component 210 and circuit board 212. As illustrated, circuit board 212 may include circuit board traces 214A-214H. In one example, one or more of circuit board traces 214A-214H may communicatively couple component 210 to another component of IHS 110. In another example, one or more of circuit board traces 214A-214H may provide power to component 210. As shown, a heat removal device 216 may be mounted to component 210. As illustrated, liquid transfer lines 218A and 218B may be coupled to heat removal device 216. In one example, liquid may be provided to heat removal device 216 via liquid transfer line 218A. In another example, liquid may be received from heat removal device 216 via liquid transfer line 218B. For instance, liquid may be removed from heat removal device 216 via liquid transfer line 218B. In one or more embodiments, a liquid transfer line 218 may be or include one or more of a liquid transfer duct, a liquid transfer conduit, a liquid transfer tube, a liquid transfer hose, and a liquid transfer pipe, among others. In one or more embodiments, heat removal device 216 may remove heat from component 210. In one or more embodiments, liquid may remove heat from heat removal device 216. For example, liquid may remove the heat that heat removal device 216 removed heat from component 210.

Figure 2B:
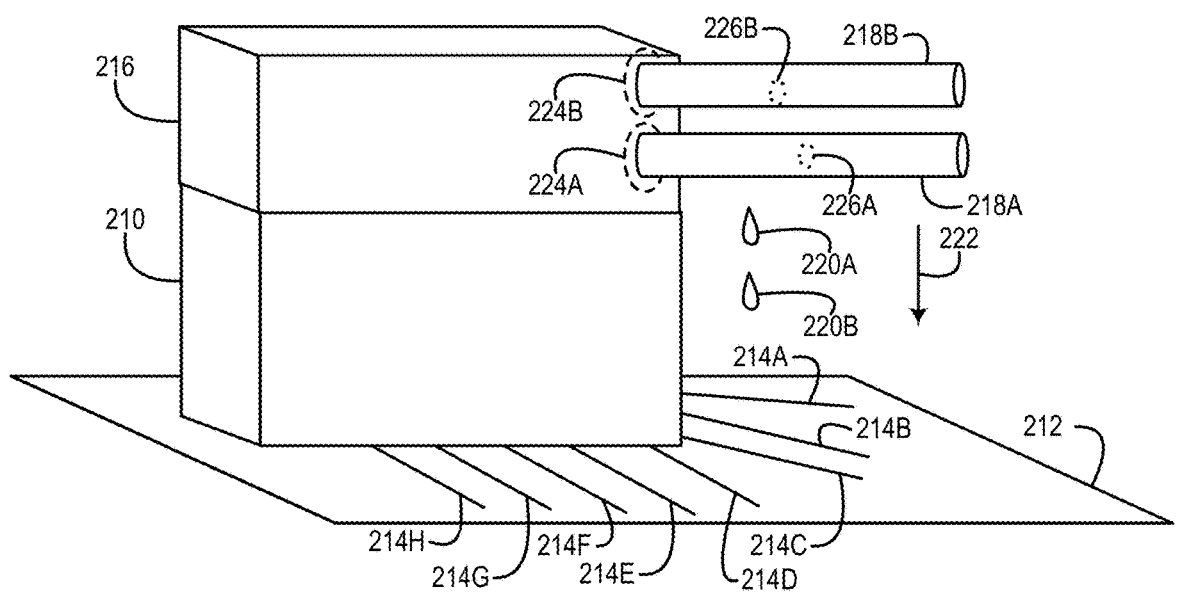
FIG. 2B illustrates another example of a circuit board and a component of an information handling system, according to one or more embodiments.

Turning now to FIG. 2B, another example of a circuit board and a component of an information handling system is illustrated, according to one or more embodiments. As shown, liquid drops 220A and 220B may have leaked. For example, liquid drops 220A and 220B may move in a direction of a gravitational force vector 222. In one or more embodiments, one or more of heat removal device 216 and liquid transfer lines 218A and 218B may be above circuit board 212 and/or component 210 with respect to gravitational force vector 222. For example, one or more of heat removal device 216 and liquid transfer lines 218A and 218B may be above circuit board 212 and/or component 210 if liquid was released from the one or more of heat removal device 216 and liquid transfer lines 218A and 218B and flow in a direction of gravitational force vector 222. For instance, the one or more of heat removal device 216 and liquid transfer lines 218A and 218B may be above circuit board 212 and/or component 210 if liquid was released from the one or more of heat removal device 216 and liquid transfer lines 218A and 218B and flow in a path that include a direction of gravitational force vector 222.

In one or more embodiments, liquid may leak from a junction 224 of heat removal device 216 and liquid transfer line 218. In one example, one or more of liquid drops 220A and 220B may leak from a junction 224A. In another example, one or more of liquid drops 220A and 220B may leak from a junction 224B. In one or more embodiments, liquid may leak from a liquid transfer line portion 226. In one example, one or more of liquid drops 220A and 220B may leak from a liquid transfer line portion 226A. In another example, one or more of liquid drops 220A and 220B may leak from a liquid transfer line portion 226B. In one or more embodiments, one or more of liquid drops 220A and 220B may leak onto circuit board 212. Liquid drops 220A and 220B may leak from other areas that are not specifically illustrated, according to one or more embodiments.

Figure 2C:
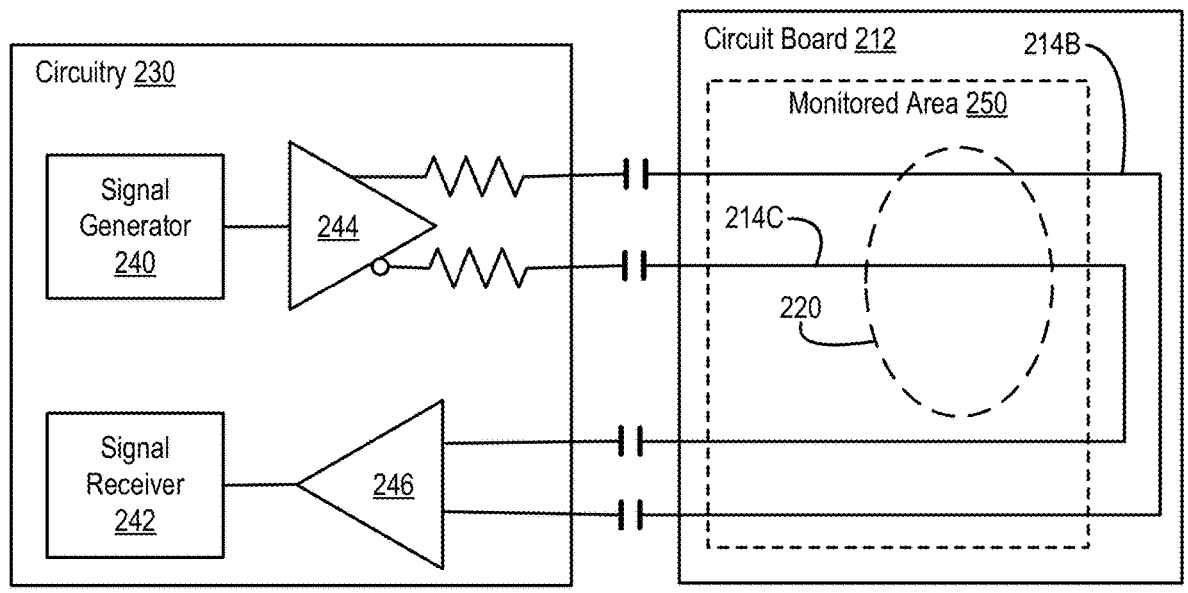
FIG. 2C illustrates an example of circuitry and a circuit board with circuit board traces, according to one or more embodiments.

Turning now to FIG. 2C, an example of circuitry and a circuit board with circuit board traces is illustrated, according to one or more embodiments. As shown, circuitry 230 may include a signal generator 240. As illustrated, circuitry 230 may include a signal receiver 242. As shown, signal generator 240 may be communicatively coupled to a buffer 244. For example, buffer 244 may be or include a differential signal buffer. As illustrated, signal receiver 242 may be communicatively coupled to a buffer 246. For example, buffer 246 may be or include a differential signal buffer. For instance, buffer 246 may recover a signal from signal generator based at least on a difference between signals from circuit board traces 214B and 214C.

In one or more embodiments, signal generator 240 may generate a signal and may provide the signal to buffer 244. As shown, buffer 244 may be communicatively coupled to circuit board traces 214B and 214C. In one or more embodiments, buffer 244 may provide a differential signal to circuit board traces 214B and 214C. For example, the differential signal provided to circuit board traces 214B and 214C may be based at least on the signal generated by signal generator 240. In one or more embodiments, circuit board traces 214B and 214C may be or include differential signal circuit board traces. For example, circuit board traces 214B and 214C may be or include PCIe differential signal circuit board traces. For instance, circuit board traces 214B and 214C may be coupled to a PCIe lane. In one or more embodiments, circuit board traces 214B and 214C may be coupled to a spare PCIe lane.

As illustrated, circuit board traces 214B and 214C may be proximate to a monitored area 250 of circuit board 212. In one or more embodiments, monitored area 250 may be monitored for a presence of liquid 220. For example, one or more of liquid drops 220A and 220B may fall into monitored area 250. For instance, the one or more of liquid drops 220A and 220B may be detected within monitored area 250.

Figure 2D:
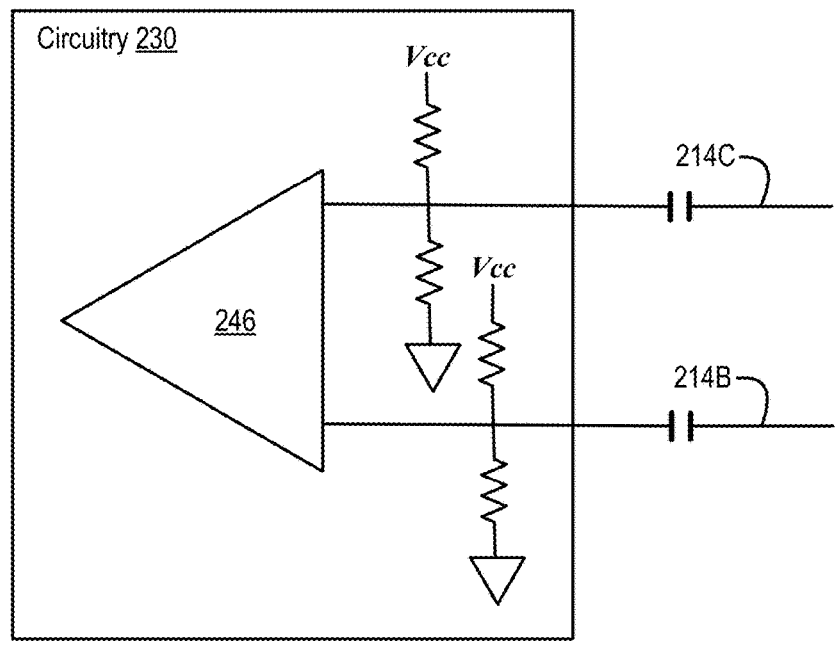
FIG. 2D illustrates an example of biasing inputs of a buffer, according to one or more embodiments.

In one or more embodiments, one or more of buffers 244 and 246 may be coupled to circuit board traces 214B and 214C via capacitors. For example, the capacitors may AC couple the one or more of buffers 244 and 246 to circuit board traces 214B and 214C. For instance, by AC coupling the one or more of buffers 244 and 246 to circuit board traces 214B and 214C, no DC signal may be present in circuit board traces 214B and 214C. In one or more embodiments, inputs of buffer 246 may be biased. For example, the inputs of buffer 246 may be biased as illustrated in FIG. 2D.

In one or more embodiments, if liquid 220 is present in monitored area 250, a signal received by signal receiver 242 may be changed from a signal provided by signal generator 240. For example, a signal received by signal receiver 242 may be compared with a signal provided by signal generator 240 to determine a change in the signal provided by signal generator 240. In one or more embodiments, if liquid 220 is present in monitored area 250, the signal change may exceed a threshold. If the signal exceeds a threshold, it may be determined that liquid 220 is present in monitored area 250.

In one or more embodiments, at least a portion of each of one or more of circuit board traces 214B and 214C may not be covered by an insulator. For example, at least a portion of each of one or more of circuit board traces 214B and 214C may not be covered by a solder mask. For instance, a solder mask may include a thin layer of polymer that may be applied to one or more circuit board traces 214. In one or more embodiments, a solder mask may provide protection against oxidation and/or may prevent solder bridges from forming between solder pads, between vias, and/or between circuit board traces 214. In one or more embodiments, at least a portion of each of one or more of circuit board traces 214B and 214C that may not be covered by an insulator may be covered by a conductor. For example, the conductor may not oxidize. For instance, the conductor that covers the at least the portion of each of one or more of circuit board traces 214B and 214C may include gold. In one or more embodiments, one or more circuit board traces 214B and 214C may be covered by an insulator. For example, one or more of circuit board traces 214B and 214C may be covered by a solder mask. For instance, one or more of circuit board traces 214B and 214C may be covered by a solder mask at least around monitored area 250. In one or more embodiments, circuitry 230 may implement at least a portion of one or more systems, one or more flowcharts, one or more methods, and/or one or more processes described herein.

Figure 2E:
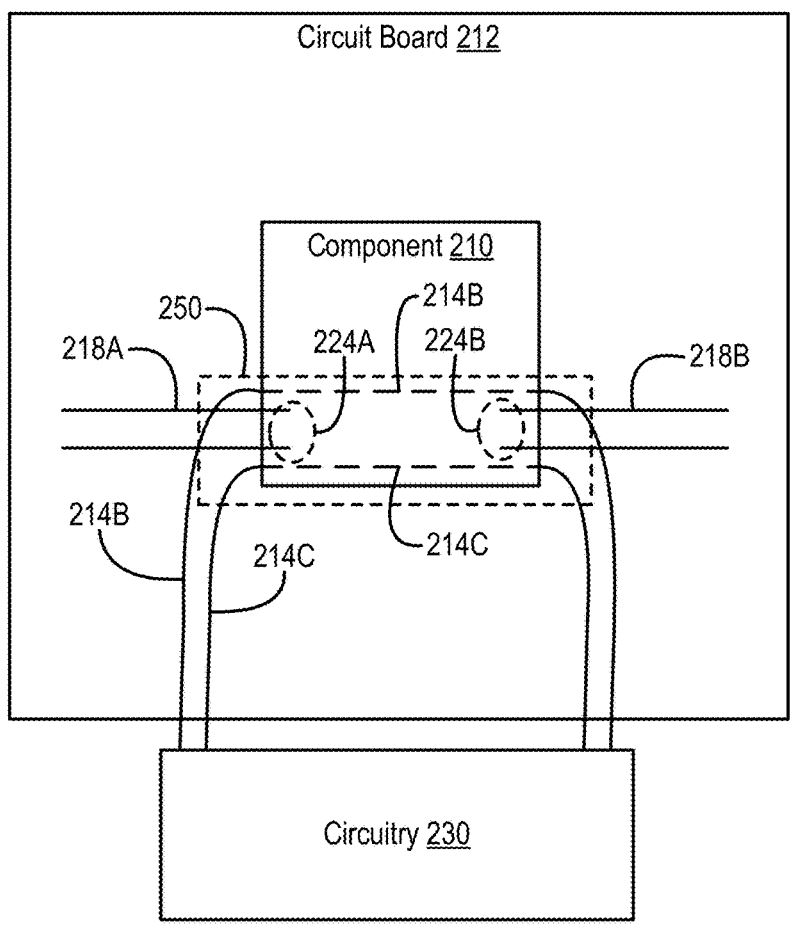
FIG. 2E illustrates another example of a circuit board and a component of an information handling system, according to one or more embodiments.

Turning now to FIG. 2E, another example of a circuit board and a component of an information handling system is illustrated, according to one or more embodiments. As shown, FIG. 2E illustrates a top-down view. Heat removal device 216 is not specifically illustrated in FIG. 2E. In one or more embodiments, heat removal device 216 may be located on component 210. Although FIG. 2E illustrates circuitry 230 apart from circuit board 212, circuitry 230 may be mounted on circuit board 212 or included in another component that is mounted on circuit board 212, according to one or more embodiments.

Figure 2F:
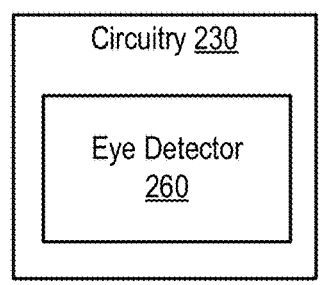
FIG. 2F illustrates an example of circuitry that includes an eye detector, according to one or more embodiments.

Turning now to FIG. 2F, an example of circuitry that includes an eye detector is illustrated, according to one or more embodiments. As shown, circuitry 230 may include an eye detector 260. In one or more embodiments, eye detector 260 may determine an eye diagram. For example, an eye diagram may be or include an eye pattern. In one or more embodiments, eye detector 260 may determine an eye diagram from a digital signal from a receiver. For example, eye detector 260 may determine an eye diagram from a digital signal from signal receiver 242. For instance, eye detector 260 may be communicatively coupled to signal receiver 242. In one or more embodiments, eye detector 260 may be repetitively sample the digital signal. For example, samples of the digital signal may be applied to a vertical axis, while a data rate may be utilized to trigger a horizontal sweep. In one or more embodiments, eye detector 260 may determine a height of an eye diagram. In one or more embodiments, eye detector 260 may determine a width of an eye diagram. In one or more embodiments, eye detector 260 may implement at least a portion of one or more systems, one or more flowcharts, one or more methods, and/or one or more processes described herein. In one or more embodiments, eye detector 260 may include one or more of a FPGA, an ASIC, and a complex logic device (CPLD), among others. In one or more embodiments, eye detector 260 may be implemented via one or more of a FPGA, an ASIC, and a CPLD, among others.

Figure 3A:
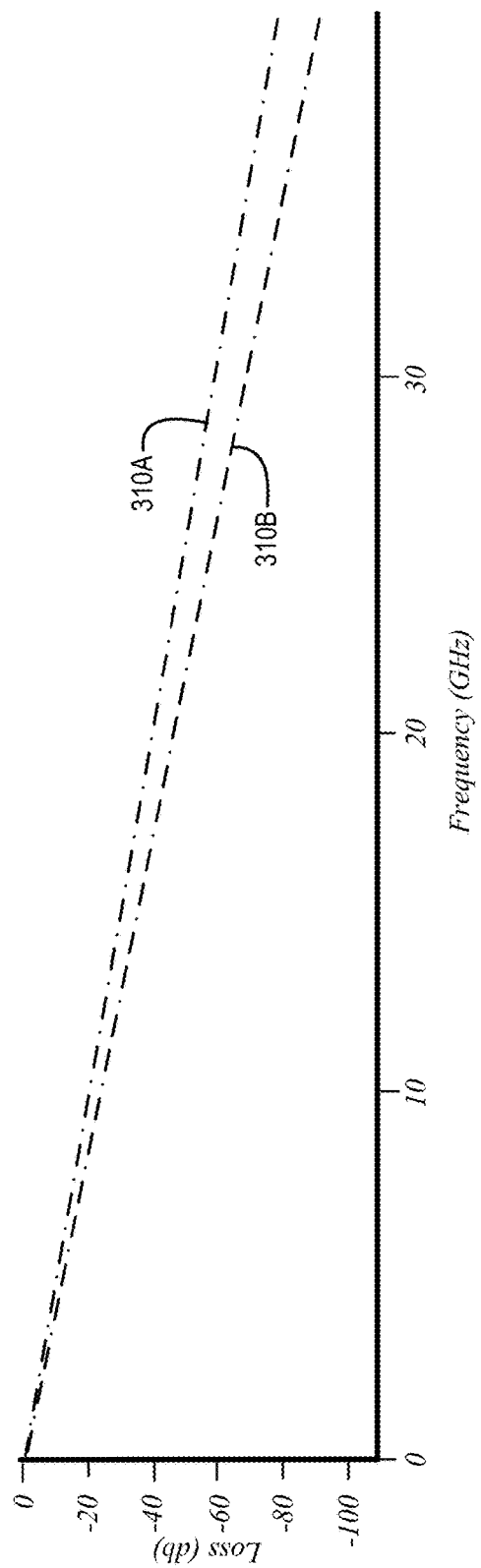
FIGS. 3A and 3B illustrate examples of plots of frequency versus signal loss, according to one or more embodiments.
Figure 3B:
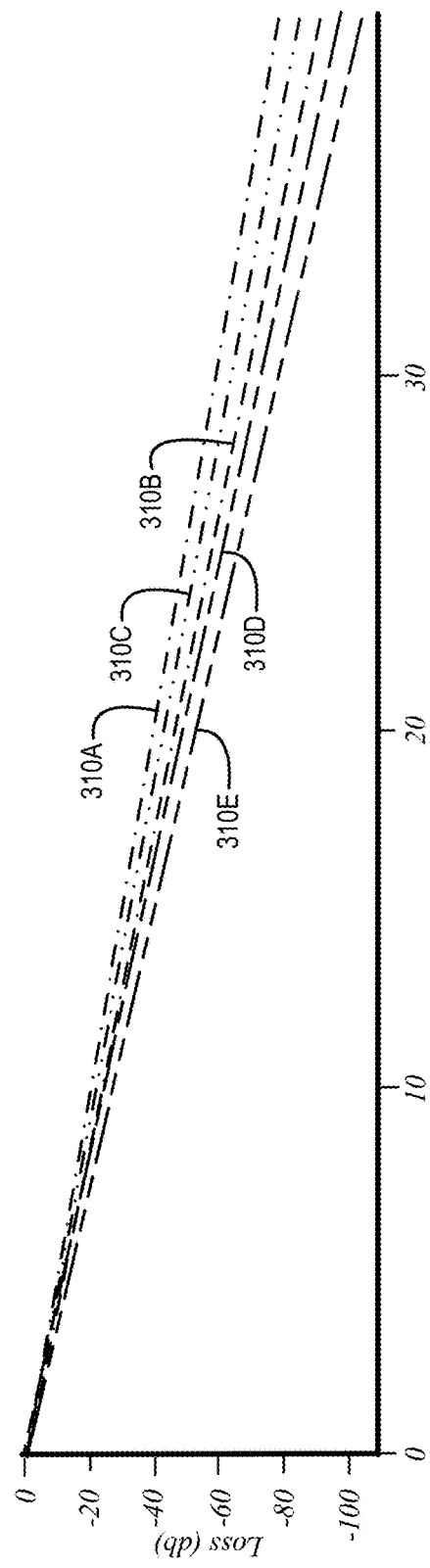

Turning now to FIGS. 3A and 3B, examples of plots of frequency versus signal loss are illustrated, according to one or more embodiments. In one or more embodiments, an amount of liquid 220 in monitored area 250 may degrade a signal generated by signal generator 240. In one example, a plot 310A may be associated with no liquid in monitored area 250. In a second example, a plot 310B may be associated with a length of one inch (1.0") of circuit board traces 214B and 214C (e.g., differential traces) exposed to liquid 220 in monitored area 250. For instance, a diameter of liquid 220 may include one inch (1.0"). In a third example, a plot 310C may be associated with a length of one half inch (0.5") of circuit board traces 214B and 214C (e.g., differential traces) exposed to liquid 220 in monitored area 250. For instance, a diameter of liquid 220 may include one half inch (0.5"). In a fourth example, a plot 310D may be associated with a length of one and one half inch (1.5") of circuit board traces 214B and 214C (e.g., differential traces) exposed to liquid 220 in monitored area 250. For instance, a diameter of liquid 220 may include one and one half inch (1.5"). In another example, a plot 310E may be associated with a length of two inches (2.0") of circuit board traces 214B and 214C (e.g., differential traces) exposed to liquid 220 in monitored area 250. For instance, a diameter of liquid 220 may include two inches (2.0").

As illustrated in plots 310A-310E, signal loss of a signal increases as a length of a differential pair of traces exposed to liquid 220 increases. For example, signal loss of the signal increases as a diameter of liquid 220 in monitored area 250 increases. In one or more embodiments, the signal loss may be or include an insertion loss. As shown in plots 310A-310E, signal loss of a signal increases as frequency of the signal increases.

Figure 4A:
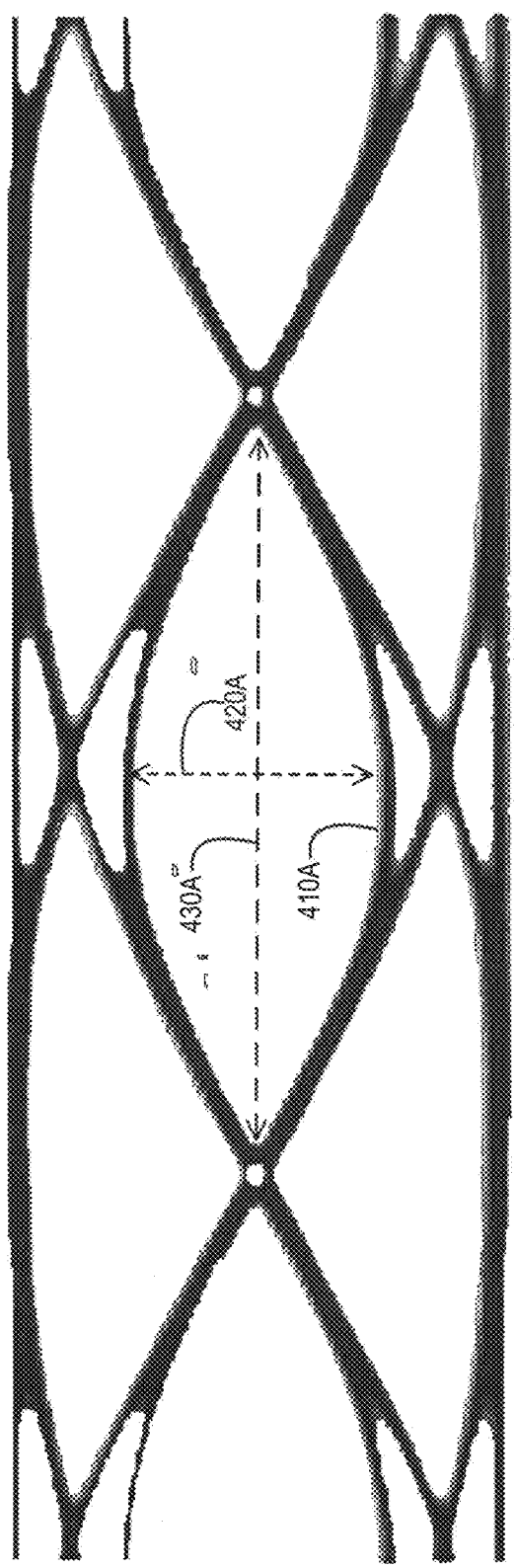
FIGS. 4A-4D illustrate example eye diagrams, according to one or more embodiments.
Figure 4B:
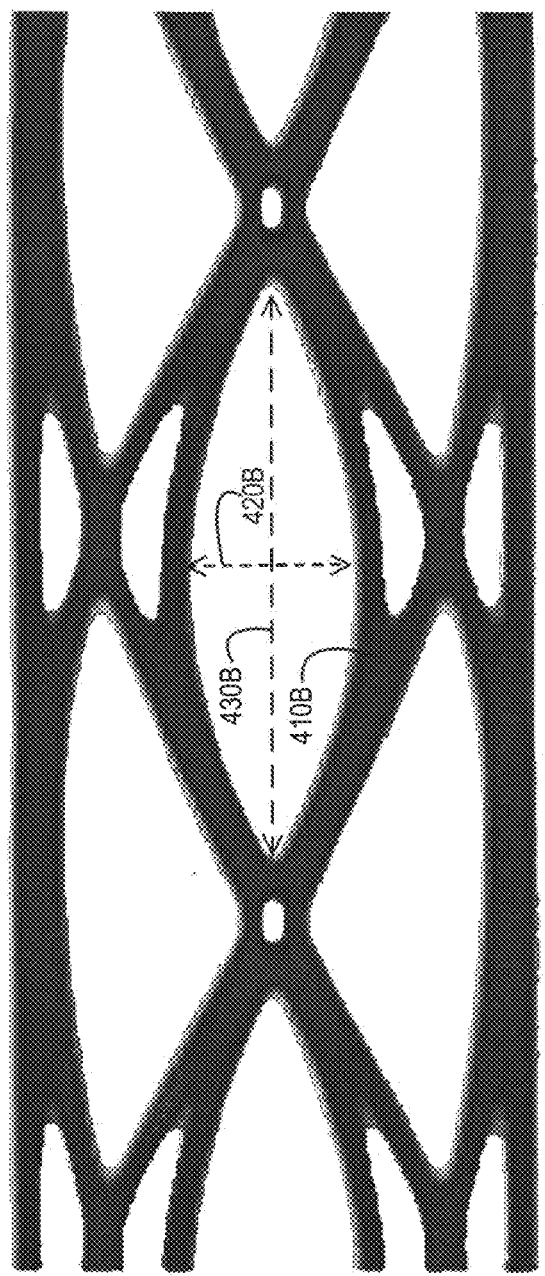
Figure 4C:
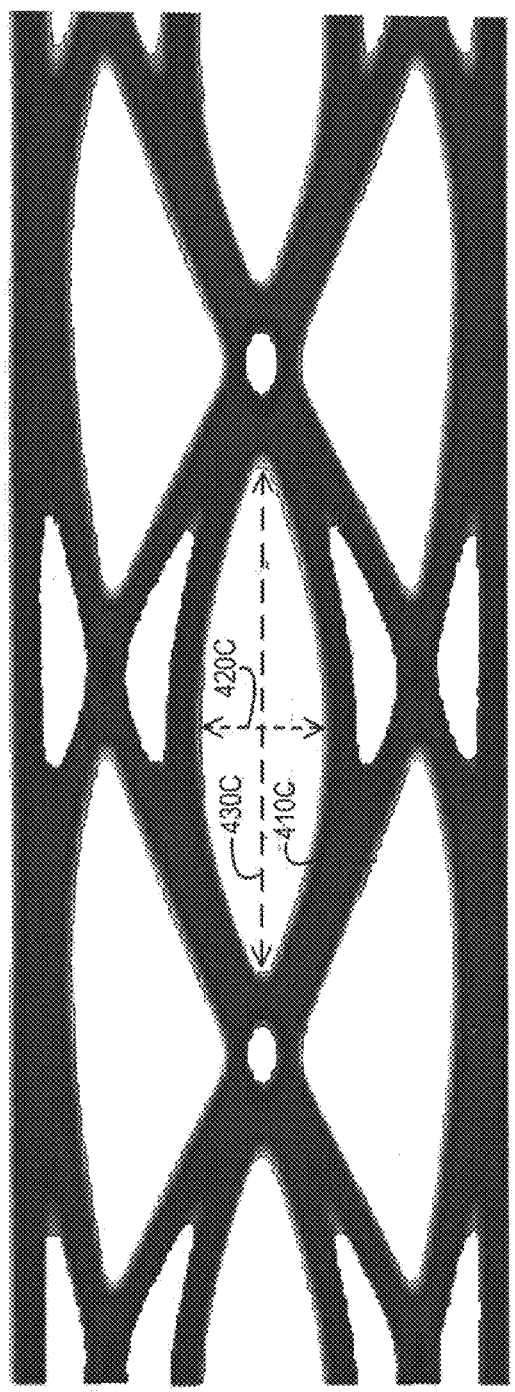
Figure 4D:
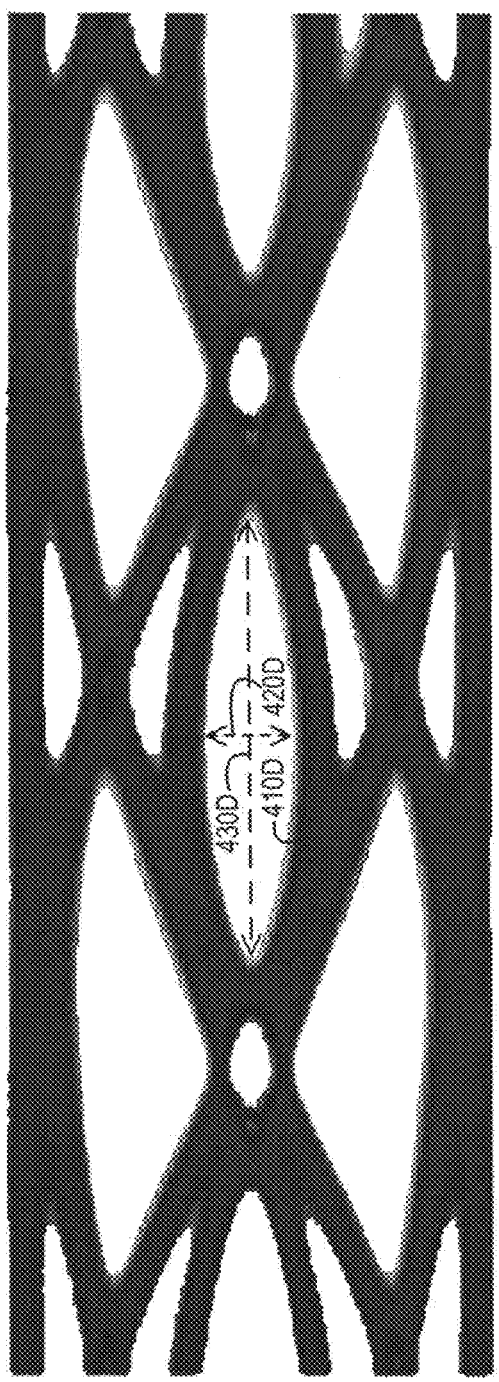

Turning now to FIGS. 4A-4D, example eye diagrams are illustrated, according to one or more embodiments. As shown in FIG. 4A, an eye 410A of a first eye diagram may be associated with a height 420A. In one or more embodiments, an eye diagram may be or include an eye pattern. For example, an eye diagram may be determined from a digital signal from a receiver. For instance, the digital signal may be repetitively sampled and applied to a vertical axis, while a data rate may be utilized to trigger a horizontal sweep. As illustrated in FIG. 4A, eye 410A may be associated with a width 430A. As shown in FIG. 4B, an eye 410B of a second eye diagram may be associated with a height 420B. As illustrated in FIG. 4B, eye 410B may be associated with a width 430B. As shown in FIG. 4C, an eye 410C of a third eye diagram may be associated with a height 420C. As illustrated in FIG. 4C, eye 410C may be associated with a width 430C. As shown in FIG. 4D, an eye 410D of a fourth eye diagram may be associated with a height 420D. As illustrated in FIG. 4D, eye 410D may be associated with a width 430D.

Figure 4E:
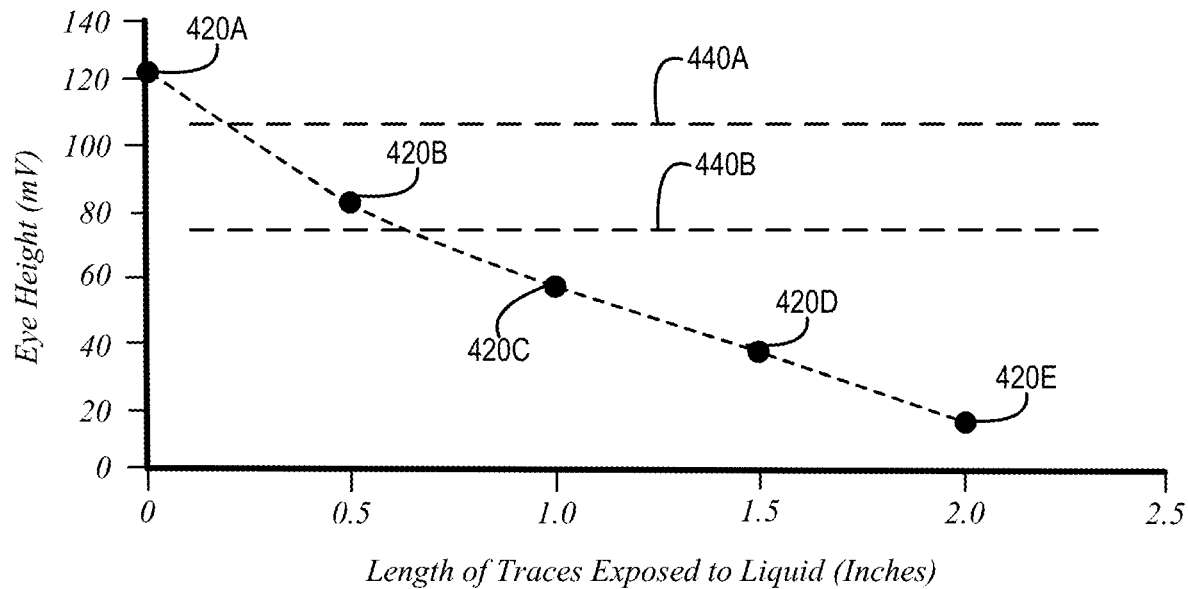
FIG. 4E illustrates an example of a plot of length of traces exposed to liquid versus eye height, according to one or more embodiments.

Turning now to FIG. 4E, an example of a plot of length of traces exposed to liquid versus eye height is illustrated, according to one or more embodiments. As shown, eye heights 420A-420E, in millivolts (mV), decrease as a diameter of liquid 220 in monitored area 250 increases. In one or more embodiments, one or more thresholds may be utilized in determining if liquid 220 is present in monitored area 250. In one example, a threshold 440A may be utilized in determining if liquid 220 is present in monitored area 250. For instance, if an eye height 420 is below threshold 440A, information may be provided, indicating a first issue (e.g., a warning). In another example, a threshold 440B may be utilized in determining if liquid 220 is present in monitored area 250. For instance, if an eye height 420 is below threshold 440B, information may be provided, indicating a second issue (e.g., an error, a failure, etc.).

Figure 4F:
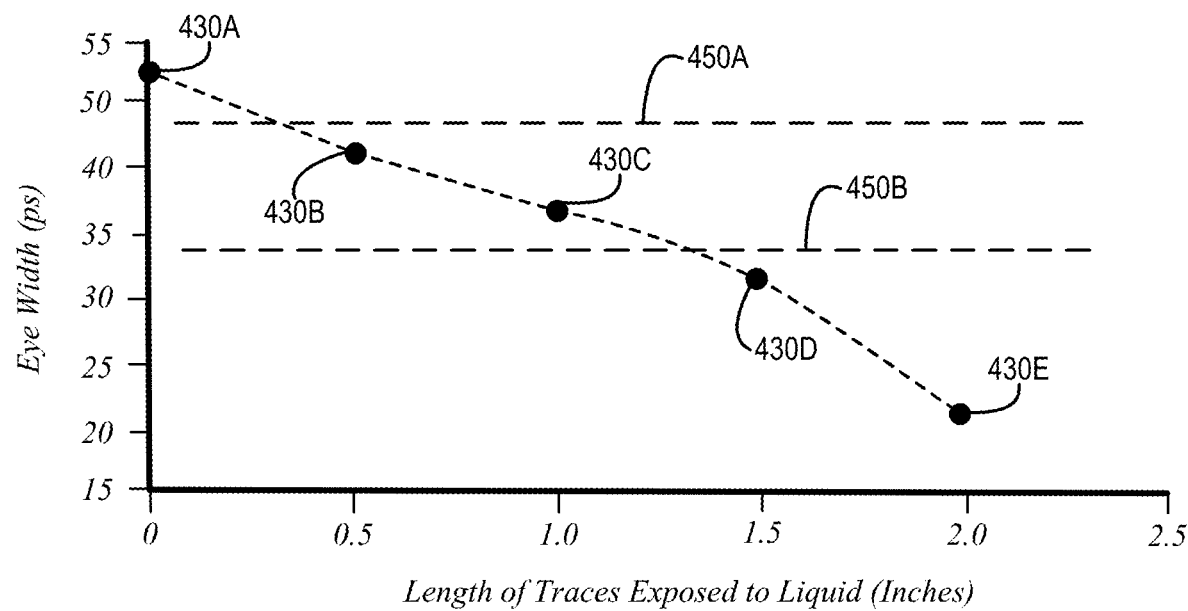
FIG. 4F illustrates an example of a plot of length of traces exposed to liquid versus eye width, according to one or more embodiments.

Turning now to FIG. 4F, an example of a plot of length of traces exposed to liquid versus eye width is illustrated, according to one or more embodiments. As shown, eye widths 430A-430E, in picoseconds (ps), decrease as a diameter of liquid 220 in monitored area 250 increases. In one or more embodiments, one or more thresholds may be utilized in determining if liquid 220 is present in monitored area 250. In one example, a threshold 450A may be utilized in determining if liquid 220 is present in monitored area 250. For instance, if an eye width 430 is below threshold 450A, information may be provided, indicating a first issue (e.g., a warning). In another example, a threshold 450B may be utilized in determining if liquid 220 is present in monitored area 250. For instance, if an eye width 430 is below threshold 450B, information may be provided, indicating a second issue (e.g., an error, a failure, etc.).

Figure 5:
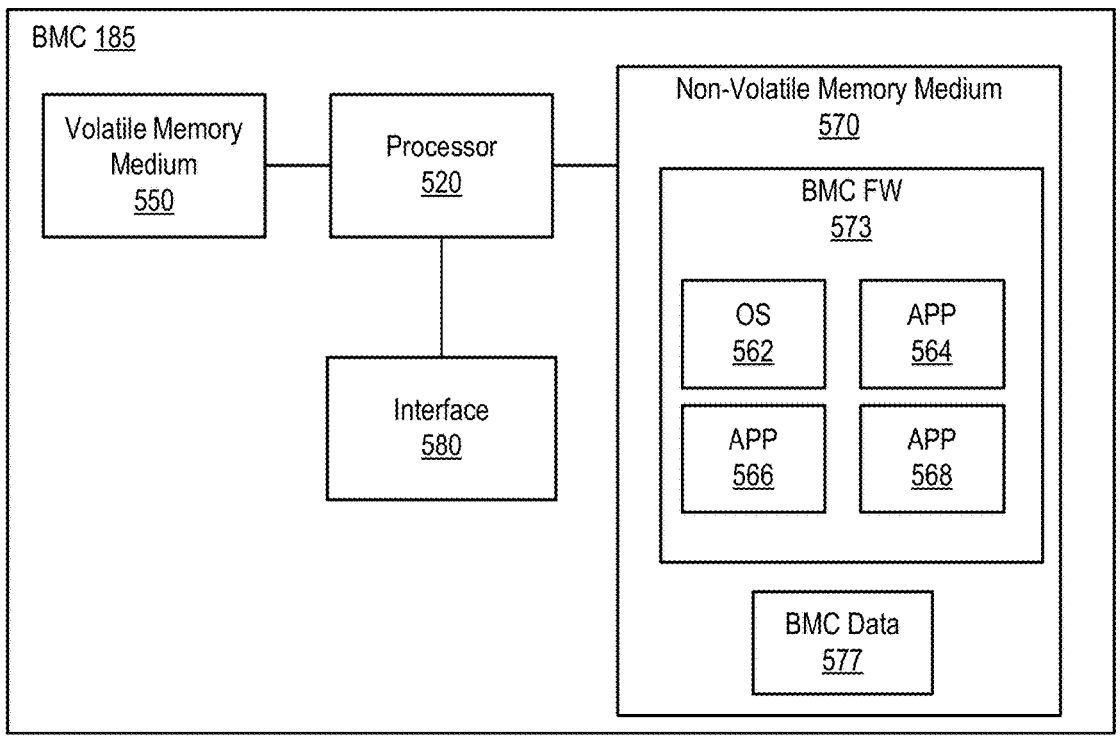
FIG. 5 illustrates an example of a baseboard management controller, according to one or more embodiments.

Turning now to FIG. 5, an example of a baseboard management controller is illustrated, according to one or more embodiments. As shown, BMC 185 may include a processor 520, a volatile memory medium 550, a non-volatile memory medium 570, and an interface 580. As illustrated, non-volatile memory medium 570 may include a BMC firmware (FW) 574, which may include an OS 562 and APPs 564-568, and may include BMC data 577. In one example, OS 562 may be or include a real-time operating system (RTOS). In another example, OS 562 may be or include an Unix-like operating system. Although not specifically illustrated, BMC 185 may include circuitry 230, according to one or more embodiments.

In one or more embodiments, interface 580 may include circuitry that enables communicatively coupling to one or more devices. In one example, interface 580 may include circuitry that enables communicatively coupling to one or more buses. For instance, the one or more buses may include one or more buses described herein, among others. In a second example, interface 580 may include circuitry that enables one or more interrupt signals to be received. In one instance, interface 580 may include general purpose input/output (GPIO) circuitry, and the GPIO circuitry may enable one or more interrupt signals to be received and/or provided via at least one interrupt line. In another instance, interface 580 may include GPIO circuitry that may enable BMC 185 to provide and/or receive signals associated with other circuitry (e.g., diagnostic circuitry, etc.). In a third example, interface 580 may include circuitry that enables communicatively coupling to one or more networks. In one instance, interface 580 may include circuitry that enables communicatively coupling to network interface 180. In a fourth example, interface 580 may include a network interface. In another example, interface 580 may include circuitry that enables communicatively coupling to circuitry 230.

In one or more embodiments, one or more of OS 562 and APPs 564-568 may include processor instructions executable by processor 520. In one example, processor 520 may execute processor instructions of one or more of OS 562 and APPs 564-568 via non-volatile memory medium 570. In another example, one or more portions of the processor instructions of the one or more of OS 562 and APPs 564-568 may be transferred to volatile memory medium 550, and processor 520 may execute the one or more portions of the processor instructions of the one or more of OS 562 and APPs 564-568 via volatile memory medium 550. In one or more embodiments, processor 520 may execute instructions in accordance with one or more of systems, flowcharts, methods, and/or processes described herein. For example, non-volatile memory medium 570 and/or volatile memory medium 560 may store instructions that may be executable in accordance with one or more of systems, flowcharts, methods, and/or processes described herein. In one or more embodiments, processor 520 may execute instructions in accordance with at least a portion of one or more of systems, flowcharts, methods, and/or processes described herein. For example, non-volatile memory medium 570 and/or volatile memory medium 560 may store instructions that may be executable in accordance with at least a portion of one or more of systems, flowcharts, methods, and/or processes described herein. In one or more embodiments, processor 520 may utilize BMC data 577. In one example, processor 520 may utilize BMC data 577 via non-volatile memory medium 570. In another example, one or more portions of BMC data 577 may be transferred to volatile memory medium 550, and processor 520 may utilize BMC data 577 via volatile memory medium 550.

Figure 6:
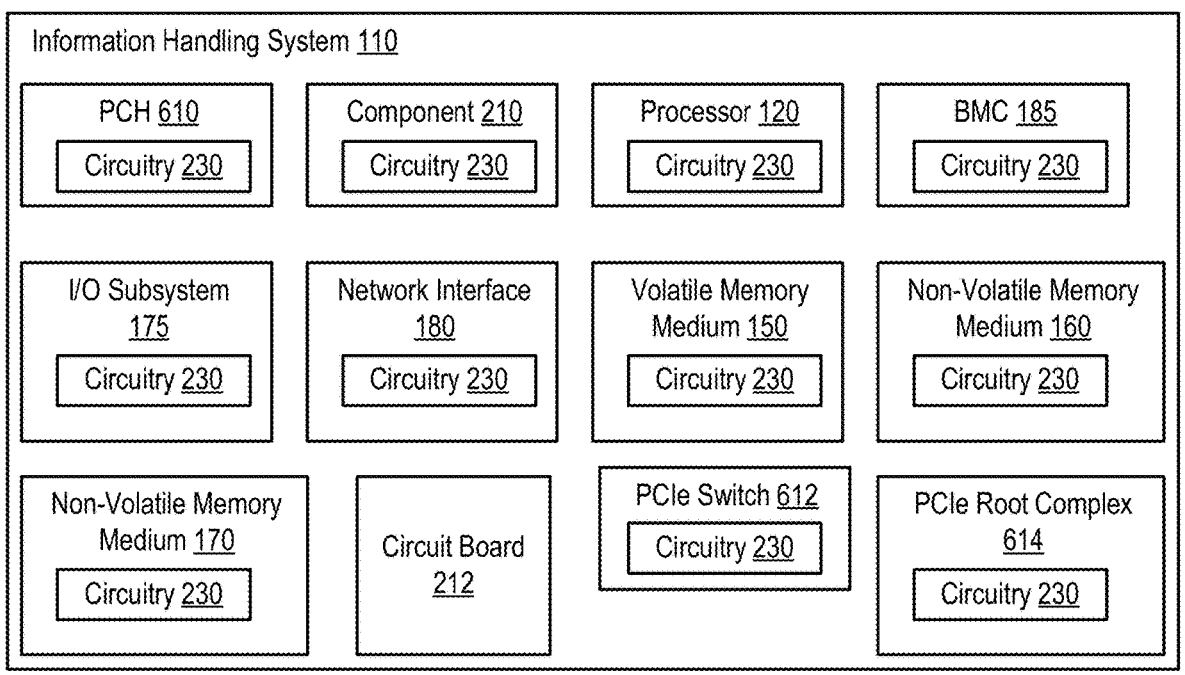
FIG. 6 illustrates examples of information handling system components that include signaling circuitry, according to one or more embodiments.

Turning now to FIG. 6, examples of information handling system components that include signaling circuitry are illustrated, according to one or more embodiments. As shown, a PCH 610 may include circuitry 230. As illustrated, component 210 may include circuitry 230. As shown, processor 120 may include circuitry 230. As illustrated, BMC 185 may include circuitry 230. As shown, I/O subsystem 175 may include circuitry 230. As illustrated, network interface 180 may include circuitry 230. As shown, volatile memory medium 150 may include circuitry 230. As illustrated, non-volatile memory medium 160 may include circuitry 230. As shown, non-volatile memory medium 170 may include circuitry 230. As illustrated, a PCIe switch 612 may include circuitry 230. As shown, a PCIe root complex 614 may include circuitry 230. In one or more embodiments, IHS 110 may include one or more of PCH 610, component 210, BMC 185, I/O subsystem 175, network interface 180, volatile memory medium 150, non-volatile memory medium 160, non-volatile memory medium 170, circuit board 212, PCIe switch 612, and PCIe root complex 614, among others.

Figure 7:
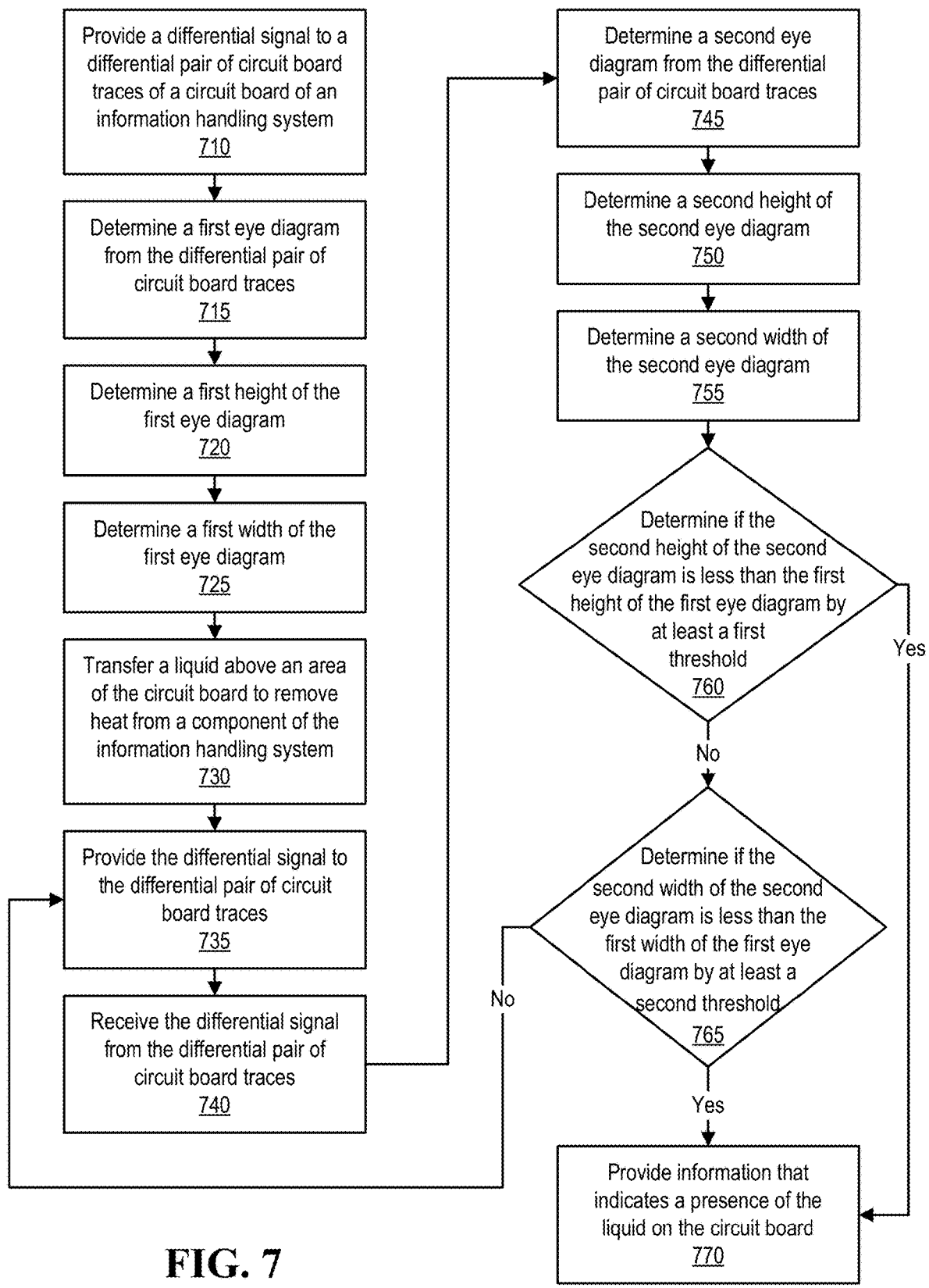
FIG. 7 illustrates an example of a method of determining a presence of liquid, according to one or more embodiments.

Turning now to FIG. 7, an example of a method of determining a presence of liquid is illustrated, according to one or more embodiments. At 710, a differential signal may be provided to a differential pair of circuit board traces of an information handling system. For example, buffer 244 may provide a differential signal to circuit board traces 214B and 214C. For instance, signal generator 240 may provide a signal to buffer 244. In one or more embodiments, buffer 244 may transform a signal from signal generator 240 into a differential signal. In one or more embodiments, the differential signal provided to the differential pair of circuit board traces of the information handling system may include a PCIe test signal. For example, a PCIe lane may include the differential pair of circuit board traces. For instance, a spare PCIe lane may include the differential pair of circuit board traces.

At 715, a first eye diagram may be determined from the differential pair of circuit board traces. For example, buffer 246 may receive the differential signal from the differential pair of circuit board traces. For instance, determining the first eye diagram from the differential pair of circuit board traces may include determining the first eye diagram from the differential signal received by buffer 246. In one or more embodiments, eye detector 260 may determine the first eye diagram. In one or more embodiments, the first eye diagram may be a baseline eye diagram. For example, the baseline eye diagram may be determined when the information handling system is configured. In one or more embodiments, the baseline eye diagram may be determined from measurements associated with the differential pair of circuit board traces. For example, a measurement associated with the differential pair of circuit board traces may include a length of the differential pair of circuit board traces.

At 720, a first height of the first eye diagram may be determined. For example, circuitry 230 may determine the first height of the first eye diagram. For instance, eye detector 260 may determine the first height of the first eye diagram. At 725, a first width of the first eye diagram may be determined. For example, circuitry 230 may determine the first width of the first eye diagram. For instance, eye detector 260 may determine the first width of the first eye diagram.

At 730, a liquid above an area of the circuit board may be transferred to remove heat from a component of the information handling system. For example, one or more of liquid transfer lines 218A and 218B may transfer liquid 220 above an area of circuit board 212 transferred to remove heat from component 210. For instance, a pump may provided liquid 220 to liquid transfer line 218B. In one or more embodiments, above an area of a circuit board may mean above an area of a circuit board with respect to a gravitational force vector. For example, one or more of liquid transfer lines 218A and 218B may be above one or more portions of circuit board 212 with respect to gravitational force vector 222, as illustrated in FIG. 2B. In one or more embodiments, area of the circuit board may be proximate to the differential pair of circuit board traces. For example, the area of the circuit board may be or include monitored area 250.

At 735, the differential signal may be provided to the differential pair of circuit board traces. In one example, the differential signal may be provided to the differential pair of circuit board traces while the liquid above the area of the circuit board is being transferred to remove heat from the component of the information handling system. In another example, the differential signal may be provided to the differential pair of circuit board traces while the liquid above the area of the circuit board is not being transferred. For instance, the liquid above the area of the circuit board may be stationary within one or more of liquid transfer lines 218A and 218B. In one or more embodiments, buffer 244 may provide the differential signal to circuit board traces 214B and 214C. For example, signal generator 240 may provide a signal to buffer 244. In one or more embodiments, signal generator 240 may provide differential signal to circuit board traces 214B and 214C via buffer 244.

At 740, the differential signal may be received from the differential pair of circuit board traces. For example, buffer 246 may receive the differential signal from circuit board traces 214B and 214C. For instance, signal receiver 242 may receive the differential signal via buffer 246. At 745, a second eye diagram may be determined from the differential pair of circuit board traces. For example, buffer 246 may receive the differential signal from the differential pair of circuit board traces. For instance, determining the second eye diagram from the differential pair of circuit board traces may include determining the second eye diagram from the differential signal received by buffer 246. In one or more embodiments, eye detector 260 may determine the second eye diagram.

At 750, a second height of the second eye diagram may be determined. For example, circuitry 230 may determine the second height of the second eye diagram. For instance, eye detector 260 may determine the second height of the second eye diagram. At 755, a second width of the second eye diagram may be determined. For example, circuitry 230 may determine the second width of the second eye diagram. For instance, eye detector 260 may determine the second width of the second eye diagram. At 760, it may be determined if the second height of the second eye diagram is less than the first height of the first eye diagram by at least a first threshold. For example, the first threshold may be an amount of volts (e.g., millivolts). In one instance, the first threshold may be threshold 440A. In another instance, the first threshold may be threshold 440B.

If the second height of the second eye diagram is less than the first height of the first eye diagram by at least the first threshold, information that indicates a presence of the liquid on the circuit board may be provided, at 770. For example, the information that indicates the presence of the liquid on the circuit board may be provided to one or more of IHS 110, processor 120, volatile memory medium 150, non-volatile memory medium 160, non-volatile memory medium 170, network interface 180, BMC 185, a display, a serial interface, and a user, among others. In one or more embodiments, one or more of IHS 110, processor 120, BMC 185, circuitry 230, and eye detector 250, among others, may provide the information that indicates the presence of the liquid on the circuit board.

If the second height of the second eye diagram is not less than the first height of the first eye diagram by at least the first threshold, it may be determined if the second width of the second eye diagram is less than the first width of the first eye diagram by at least the second threshold, at 765. In one example, the second threshold may be threshold 450A. In another example, the second threshold may be threshold 450B. If the second width of the second eye diagram is less than the first width of the first eye diagram by at least the second threshold, the method may proceed to 770. If the second width of the second eye diagram is not less than the first width of the first eye diagram by at least the second threshold, the method may proceed to 735, according to one or more embodiments. In one or more embodiments, providing the information that indicates the presence of the liquid on the circuit board may be performed in response to determining at least one of that the second height of the second eye diagram is less than the first height of the first eye diagram by at least the first threshold and that the second width of the second eye diagram is less than the first width of the first eye diagram by at least the second threshold.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a circuit board that includes a differential pair of circuit board traces;
   at least one processor coupled to the circuit board; and
   an eye detector configured to:
      determine a first height of a first eye diagram of a differential pair of circuit board traces of a circuit board of an information handling system; and
      determine a first width of the first eye diagram;
   at least one liquid transfer line configured to transfer a liquid above an area of the circuit board to remove heat from the at least one processor;
   a signal generator configured to provide a differential signal to the differential pair of circuit board traces, the differential pair of circuit board traces proximate to the area of the circuit board;
   a signal receiver configured to receive the differential signal from the differential pair of circuit board traces;
   wherein the eye detector is further configured to:
      determine a second height of a second eye diagram of the differential pair of circuit board traces;
      determine a second width of the second eye diagram;
      determine at least one of that the second height of the second eye diagram is less than the first height of the first eye diagram by at least a first threshold and that the second width of the second eye diagram is less than the first width of the first eye diagram by at least a second threshold; and
      in response to determining the at least one of that the second height of the second eye diagram is less than the first height of the first eye diagram by at least the first threshold and that the second width of the second eye diagram is less than the first width of the first eye diagram by at least the second threshold, provide information that indicates a presence of the liquid on the circuit board.

2. The information handling system of claim 1, wherein the differential pair of circuit board traces surround the area of the circuit board.

3. The information handling system of claim 1, further comprising:
   a network interface that includes the signal generator and the signal receiver.

4. The information handling system of claim 3, wherein the network interface includes an Ethernet interface that include the signal generator and the signal receiver.

5. The information handling system of claim 3, further comprising:
   a microcontroller that includes the network interface.

6. The information handling system of claim 1, further comprising:
   a platform controller hub that includes the signal generator and the signal receiver.

7. The information handling system of claim 1, wherein a Peripheral Component Interconnect Express (PCIe) lane is coupled to the differential pair of circuit board traces.

8. The information handling system of claim 7, further comprising:
   a PCIe switch;
   wherein the PCIe switch includes the PCIe lane.

9. The information handling system of claim 1, wherein the liquid includes a percentage of water.

10. The information handling system of claim 1, wherein, to provide the information that indicates the presence of the liquid on the circuit board, the eye detector is further configured to provide the information to at least one of a baseboard management controller of the information handling system and the at least one processor.

11. A method, comprising:
    determining a first height of a first eye diagram of a differential pair of circuit board traces of a circuit board of an information handling system;
    determining a first width of the first eye diagram;
    transferring a liquid above an area of the circuit board to remove heat from a component of the information handling system;
    a signal generator providing a differential signal to the differential pair of circuit board traces, the differential pair of circuit board traces proximate to the area of the circuit board;
    a signal receiver receiving the differential signal from the differential pair of circuit board traces;
    determining a second height of a second eye diagram of the differential pair of circuit board traces;
    determining a second width of the second eye diagram;
    determining at least one of that the second height of the second eye diagram is less than the first height of the first eye diagram by at least a first threshold and that the second width of the second eye diagram is less than the first width of the first eye diagram by at least a second threshold; and
    in response to the determining the at least one of that the second height of the second eye diagram is less than the first height of the first eye diagram by at least the first threshold and that the second width of the second eye diagram is less than the first width of the first eye diagram by at least the second threshold, providing information that indicates a presence of the liquid on the circuit board.

12. The method of claim 11, wherein the differential pair of circuit board traces surround the area of the circuit board.

13. The method of claim 8, wherein at least one of a network interface and a platform controller hub includes the signal generator and the signal receiver.

14. The method of claim 13,
- wherein the network interface includes the signal generator and the signal receiver; and
- wherein the network interface includes an Ethernet interface that include the signal generator and the signal receiver.

15. The method of claim 13,
- wherein the network interface includes the signal generator and the signal receiver; and
- wherein a microcontroller includes the network interface.

16. The method of claim 11, wherein a Peripheral Component Interconnect Express (PCIe) lane is coupled to the differential pair of circuit board traces.

17. The method of claim 16, wherein a PCIe switch of the information handling system includes the PCIe lanes.

18. The method of claim 16, wherein a PCIe root complex of the information handling system includes the PCIe lanes.

19. The method of claim 11, wherein the liquid includes a percentage of water.

20. The method of claim 11, wherein the providing the information that indicates the presence of the liquid on the circuit board includes providing the information to at least one of a baseboard management controller of the information handling system and a processor of the information handling system.

* * * * *